(12) United States Patent
Hamilton, II et al.

(10) Patent No.: US 7,493,296 B2
(45) Date of Patent: Feb. 17, 2009

(54) METHOD AND SYSTEM FOR CLASSIFYING INFORMATION

(75) Inventors: Rick A. Hamilton, II, Charlottesville, VA (US); Gino A. Palozzi, Westerville, OH (US); Evan A. Salop, Riverside, CT (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 11/421,216

(22) Filed: May 31, 2006

(65) Prior Publication Data

US 2007/0282897 A1 Dec. 6, 2007

(51) Int. Cl.
*G06F 17/00* (2006.01)
*G06F 12/00* (2006.01)
*G06F 17/30* (2006.01)
*G06N 5/00* (2006.01)

(52) U.S. Cl. .......................................... 706/45; 707/200

(58) Field of Classification Search ............. 707/103 R, 707/200; 706/20, 45
See application file for complete search history.

(56) References Cited

U.S. PATENT DOCUMENTS

| | | | |
|---|---|---|---|
| 6,442,549 B1 | 8/2002 | Schneider | |
| 6,662,183 B2 | 12/2003 | Beyer | |
| 6,697,378 B1 | 2/2004 | Patel | |
| 7,031,901 B2 * | 4/2006 | Abu El Ata | 703/21 |
| 7,092,975 B2 * | 8/2006 | Bradley et al. | 707/204 |
| 2002/0147715 A1 | 10/2002 | Beyer | |
| 2005/0108474 A1 | 5/2005 | Zhang et al. | |

* cited by examiner

*Primary Examiner*—David R Vincent
*Assistant Examiner*—Benjamin Buss
(74) *Attorney, Agent, or Firm*—Cardinal Law Group; David A. Mims; Robert C. Rolnik

(57) ABSTRACT

A method for classifying information includes determining a plurality of management characteristics for an information type, determining a plurality of business characteristics for the information type, determining at least one management tally for the information type based on the management characteristics, determining at least one business tally for the information type based on the business characteristics, and determining a global information class for the information type based on the management tally and the business tally. A computer usable medium with suitable computer program code is employed for classifying information.

1 Claim, 5 Drawing Sheets

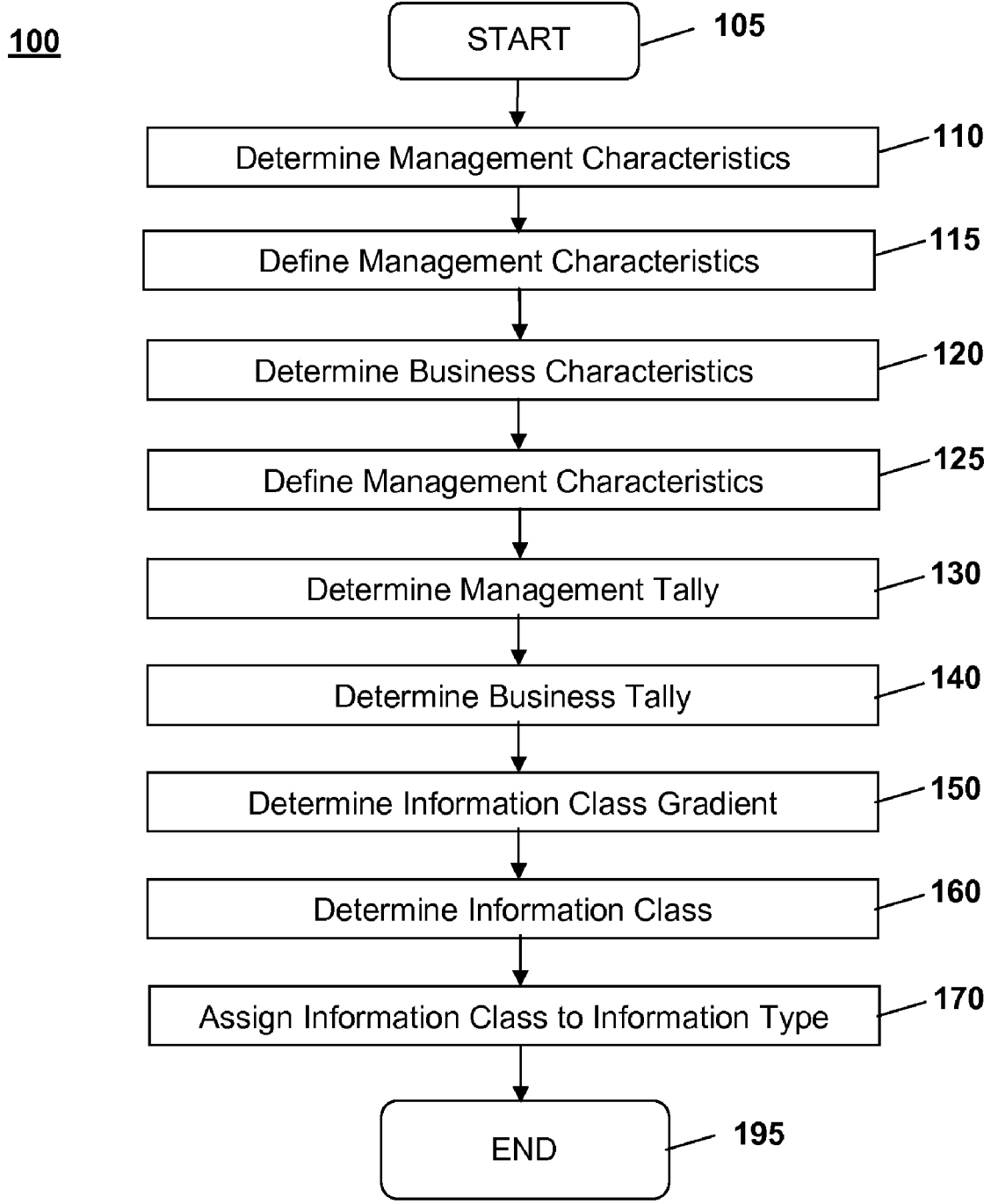

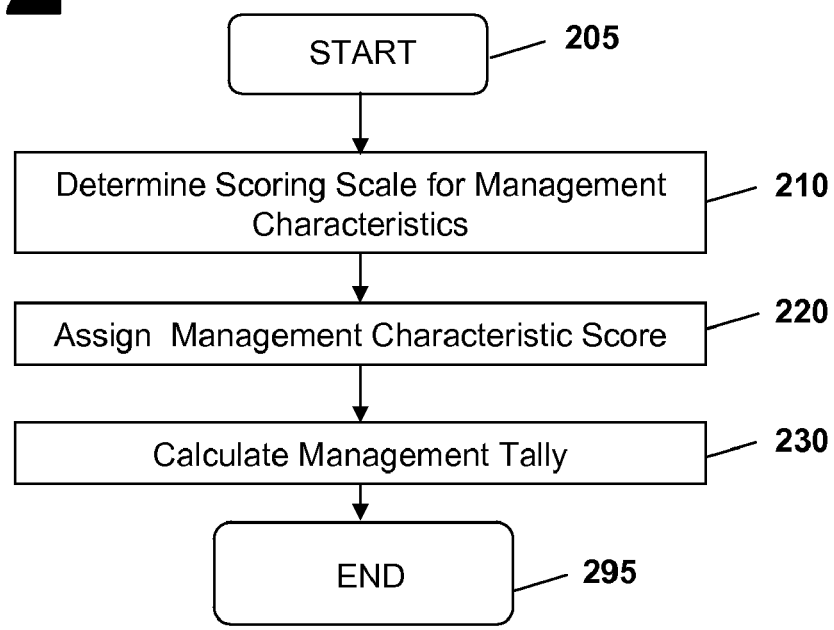
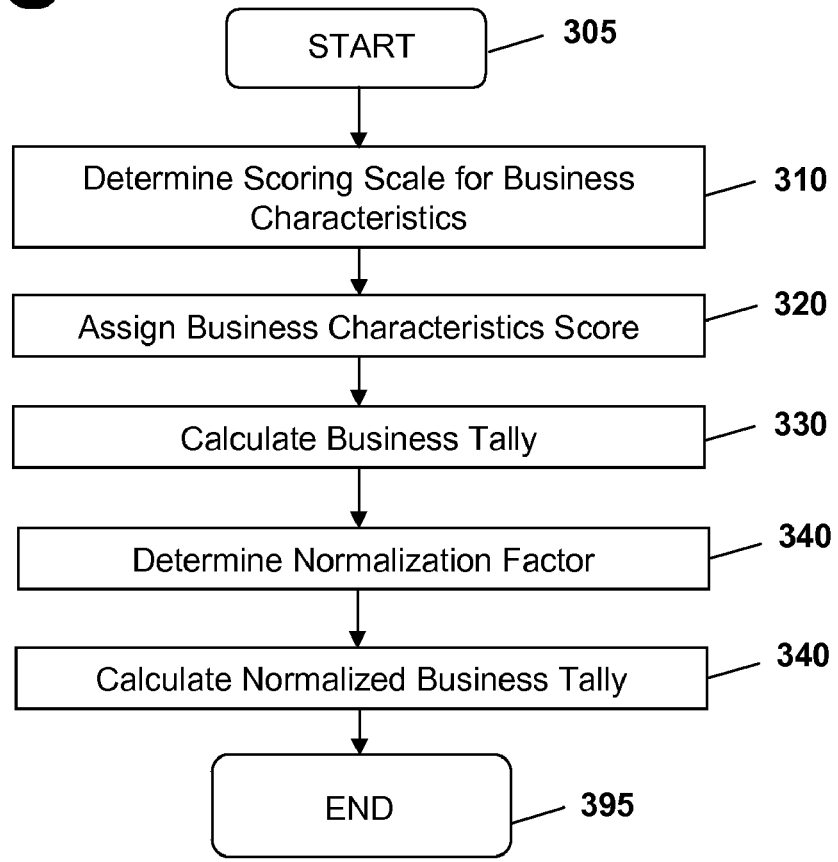

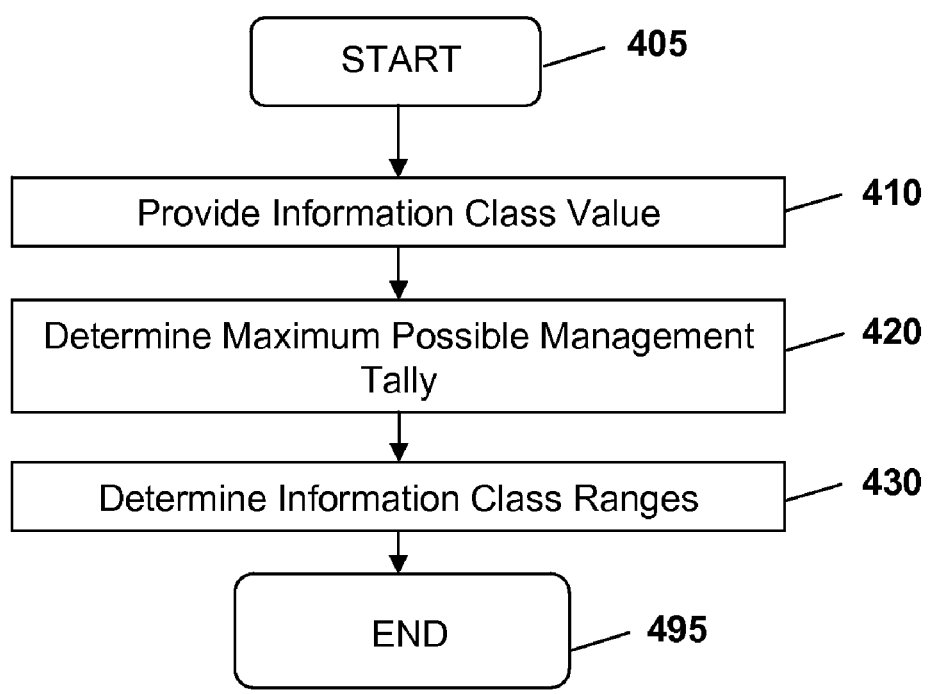

METHOD AND SYSTEM FOR CLASSIFYING INFORMATION

FIELD OF THE INVENTION

This invention relates generally to managing information. In particular the invention relates to a method and system for classifying information.

BACKGROUND OF THE INVENTION

As the strategic alignment of business with information technology (IT) has become more critical to the success of the business, the management of information has become a higher priority. Additionally, the volume of information that a business must manage has become increasingly large. Some of this information is critical to the business while other information has only minor value to the business. Most of the information maintained by a business falls between these two extremes.

As the volume of information increases the actual cost to maintain that information also increases. The cost of maintaining a storage infrastructure is often the largest part of an IT budget. Businesses looking to limit resources applied to the storage infrastructure must reduce the amount of information that must be stored. Furthermore, information management activities such as backup strategies, archiving strategies and storage priorities require a determination of what information to save and for how long to retain the information before it is discarded. Current methods of classifying information are commonly unstructured evaluations performed by ad hoc groups within an IT organization.

Information classification methodologies must be reproducible and produce consistent results. Furthermore, both objective and subjective factors must be considered when determining the importance of a particular piece of information to the business. Current ad hoc methodologies provide little reproducibility and fail to yield consistent results.

It is therefore desirable to provide a method and system for classifying information that overcomes the limitations, challenges, and obstacles described above.

SUMMARY OF THE INVENTION

One aspect of the invention provides a method for classifying information. The method includes determining a plurality of management characteristics for an information type, determining a plurality of business characteristics for the information type, determining at least one management tally for the information type based on the management characteristics, determining at least one business tally for the information type based on the business characteristics, and determining a global information class for the information type based on the management tally and the business tally.

Another aspect of the invention provides a computer readable medium storing a computer program including computer program code for classifying information. The medium includes computer program code for determining a plurality of management characteristics for an information type, computer program code for determining a plurality of business characteristics for the information type, computer program code for determining at least one management tally for the information type based on the management characteristics, computer program code for determining at least one business tally for the information type based on the business characteristics, and computer program code for determining a global information class for the information type based on the management tally and the business tally.

A third aspect of the invention provides a system for classifying information. The system includes means for determining a plurality of management characteristics for an information type, means for determining a plurality of business characteristics for the information type, means for determining at least one management tally for the information type based on the management characteristics, means for determining at least one business tally for the information type based on the business characteristics, and means for determining a global information class for the information type based on the management tally and the business tally.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 illustrates a flowchart representative of one example of a method for classifying information, in accordance with the invention;

FIG. 2 illustrates a flowchart representative of one example of a method for determining the management tally, in accordance with the invention;

FIG. 3 illustrates a flowchart representative of one example of a method for determining the business tally, in accordance with the invention;

FIG. 4 illustrates a flowchart representative of one example of a method for determining an information class gradient, in accordance with the invention;

DETAILED DESCRIPTION OF THE PRESENTLY PREFERRED EXAMPLES

Figure 5:
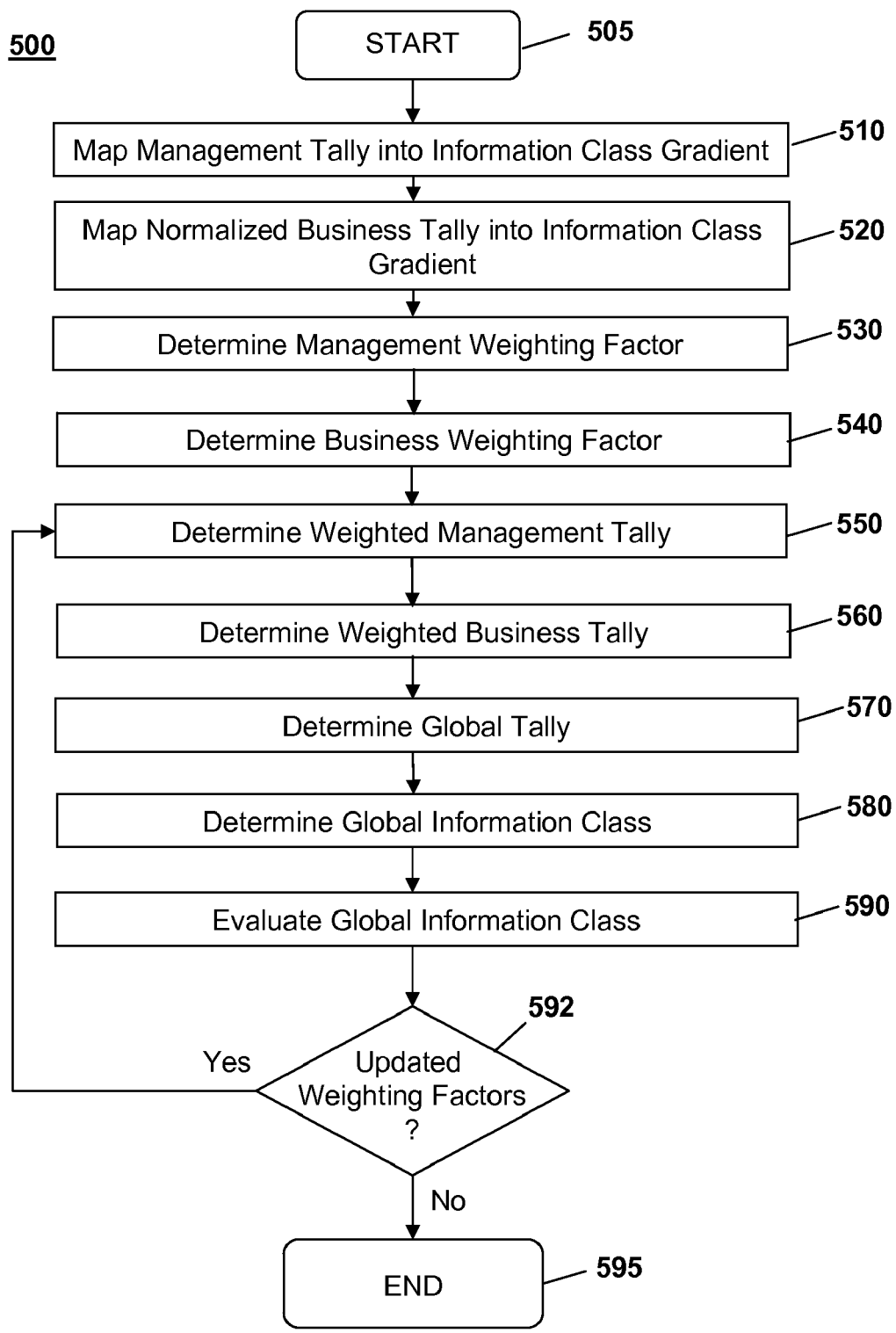
FIG. 5 illustrates a flowchart representative of one example of a method for determining the information class for the information type, in accordance with the invention.

FIG. 1 illustrates a flowchart representative of one example of a method for classifying information, in accordance with the invention at 100. The method begins at 105.

An information type is a set of data that is under evaluation and is designated for classification. The information type can represent data at various levels of granularity. For example, the information type can be an individual file, files in a particular group, a storage device, a business process, an application, or a system. Groups of files can be composed of, all files with the same file type, all files at a certain storage location, all files on a storage device, or all files on a system. Information types representing the same level of granularity can be classified, thereby allowing a determination of the relative importance of the various information types. Classifying the information types facilitates automated management of the data and the identification of trends among the data, such as identifying an information type that is increasingly important to a business.

Management characteristics are determined for the information type (block 110). The management characteristics are selected from a predetermined group of management characteristics. The management characteristics represent metadata pertaining to the information to be classified (information type). The metadata is provided by a data owner responsible for managing the data. The data owner can refer to anyone authorized to manage, evaluate, or administer the information type. The management characteristics are chosen based on empirical reporting data and structured feedback obtained from the data owner during an assessment. Structured feedback includes interview or questionnaire responses given by the data owner. In one example, at least six management characteristics are required including recoverability, availability, performance, scalability, manageability, and security. Additional management characteristics are used for further delineation of the data.

The management characteristics are defined (block 115) according to the term's use relative to the business needs of the data owner. For example, the management characteristic "availability" might be defined as a number of single points of failure or as an amount of downtime as a percentage of up-time.

Business characteristics are determined (block 120). The business characteristics are selected from a predetermined group of business characteristics. Business characteristics represent the importance of the data to the operation of the business. In one example, the business value characteristics reflect the costs of retaining the data and the costs of recovering the data if lost. In one example, business characteristics include business criticality, total cost of ownership (TCO), and outage cost.

The business characteristics are defined (block 125). TCO, for example, can be defined as the infrastructure cost, the cost to manage, the purchase cost of the data, or some combination thereof.

A management tally is determined for the information type (block 130) using the management characteristics determined at block 110. The management tally represents the relative importance of the information type as a function of various factors related to managing the information type. The management tally also allows a determination of the value of the information type relative to other information types having the same level of granularity.

The relative ranking of various information types allows a separation of information into a group of information classes where all information types in the same information class possesses a similar level of importance. Information classes can be further defined and labels applied, such as mission critical, business vital, important, and productive.

A business tally is then determined for the information type (block 140) using the business characteristics determined at block 120. The business tally represents the relative importance of the information type as a function of the value of the information type to the operation of the business.

An information class gradient is determined (block 150). The information class gradient contains a number of information class ranges defined by the data owner. The information class ranges delimit the various information classes into which an information type is classified. Each information class represents a level of importance to the data owner of the information types within that Information class. In one example, the data owner can attach policies to an information class. The policies contain rules pertaining to retention, backup, storage, access, and security.

An information class is determined (block 160) for the information type based on the management tally and the business tally. The number of information classes defined is dependent on the level of gradation as specified by the data owner and as needed for the information type. The information class is assigned to the information type based on the determination (block 170). In one example, the information type can then be stored using a storage scheme based on the information class gradient.

The method terminates (block 195).

FIG. 2 illustrates a flowchart representative of one example of a method for determining the management tally at block 130 of FIG. 1, in accordance with the invention at 200. The method begins at 205.

A management characteristic scoring scale is determined for the management characteristics (block 210) determined at block 110 of FIG. 1. In one example, the scoring scale is assigned the values 1 through 5, with 1 representing the least importance and 5 representing the greatest importance. For example, when scoring the management characteristic "availability," a score of 5 represents zero single points of failure, and a score of 1 represents multiple single points of failure.

Each of the management characteristics for the information type is assigned a management characteristic score (block 220). The data owner uses the scoring scale, determined at block 210, for scoring each management characteristic. The value assigned is based on the significance of the management characteristic, as defined, to the information type under evaluation.

The management tally is calculated based on the scored management characteristics associated with the information type (block 230). In one example, the management tally for an information type is calculated as follows:

$$MT = \sum_{i=1}^{N} (S_i - K)$$

Where:

MT is the management tally for the information type;

$S_i$ is the score for the $i^{th}$ management characteristic;

N is the total number of management characteristics selected for the information type; and K is the lowest possible score on the management characteristic scoring scale.

The variable K adjusts the minimum score to a "0" value independent of the scoring scale determined in block 210. The application of the variable K to the scoring scale 1 to 5 used in the example produces an effective scoring scale of 0 to 4.

The method terminates (block 295).

FIG. 3 illustrates a flowchart representative of one example of a method for determining the business tally at block 140 of FIG. 1, in accordance with the invention at 300. The method begins at 305.

A business characteristic scoring scale is determined for the business characteristics (block 310) determined at block 120 of FIG. 1. Preferably, the scoring scale is the same scale used for the management characteristics from block 210 of FIG. 2. Other scoring scales can be used, but the final scores for the management characteristics and the business characteristics are aligned to prevent either from having a disproportionate effect on the information classification.

Each of the business characteristics for the information type is assigned a business characteristic score (block 220). The data owner uses the scoring scale, determined in the previous step, for scoring each business characteristic. The value assigned is based on the significance of the business characteristic, as defined, to the information type under evaluation.

The business tally is calculated based on the scored business characteristics associated with the information type (block 230). In one example, the business tally for an information type is calculated as follows:

$$BT = \sum_{i=1}^{NB} (SB_i - K)$$

Where:

BT is the business tally for the information type;

$SB_i$ is the score for the $i^{th}$ business characteristic;

NB is the total number of business characteristics selected for the information type; and K is the lowest possible score on the business characteristic scoring scale.

A normalization factor is determined for the business tally (block 340). The normalization factor corrects for a difference in the number of management characteristics and the number of business value characteristics and also aligns the management characteristic score and the business characteristic score if different scoring scales are used. In one example, three business characteristics using a scoring scale of 1 through 5 is selected and six management characteristics using a scoring scale of 1 through 10 is selected. The normalization factor is determined as $MT_{max}/BT_{max}$, or 54/12=4.5 in the example. The determinations of $MT_{max}$ and $BT_{max}$ are described below. A normalized business tally is calculated by multiplying the business tally by the normalization factor (block 350).

The method terminates (block 395).

FIG. 4 illustrates a flowchart representative of one example of a method for determining an information class gradient, in accordance with the invention at 400. The method begins at 405.

An information class value is provided by the data owner (block 410). The information class value is the number of information classes into which the information type is classified. The value is selected to sufficiently distinguish different information types while retaining a manageable number of information classes. In one example, an information class value of "4" is selected. The number of selected management characteristics and the information class value have a direct relationship. To prevent overly broad information class ranges the information class value increases as the number of selected management characteristics increases. Similarly, to prevent overly restrictive information class ranges the information class value would decrease as the number of selected management characteristics decreased.

A maximum possible management tally is determined (block 420). The maximum possible management tally is a summation of the maximum possible management characteristic scores for a particular information type. In one example, the maximum possible management tally is calculated as follows:

$$MT_{max} = \sum_{i=1}^{N} (S_{i\,max} - K)$$

Where:

$MT_{max}$ is the maximum possible management tally

N is the total number of management characteristics selected for the information type;

$S_{i\,max}$ is the maximum possible score for the ith management characteristic; and K is the lowest possible score on the scoring scale.

In one example, 6 management characteristics are selected each having a minimum possible score of "1" and maximum possible score of "5", therefore, N=6, $S_{i\,max}$=5 and K=1. From the above equation the maximum possible management tally $MT_{max}$ is 24. The maximum possible management tally is the maximum possible score that can be applied to an information type considering each of the selected management characteristics. A determination of $BT_{max}$ follows the same logic as the determination of $MT_{max}$.

From the maximum possible management tally an information class gradient is determined (block 430). The Information class gradient delineates individual information classes. The number of information classes ($N_{ic}$) is determined by the data owner based on the level of classification required. The range of each information class is equivalent to $MT_{max}/N_{ic}$.

In the previous example, if 4 information classes are specified then ($N_{ic}$=4) and $MT_{max}$=24, therefore, each information class comprises (24/4) or 6 units. The information class gradient starts at "1" and continues up to $MT_{max}$, consequently, the resulting information class gradient includes the following information class ranges for the management tally: 1-6, 7-12, 13-18, and 19-24 representing the four information classes. It should be noted that although "0" is a possible value for the management tally (all management characteristics assigned lowest possible score), an information type having a management tally equal to "0" will be re-evaluated.

The method terminates (block 495).

FIG. 5 illustrates a flowchart representative of one example of a method for determining the information class for the information type, in accordance with the invention at 500. The method begins at 505.

The management tally is mapped into the information class gradient and the resulting information class is a management information class for the information type (block 510). Additional management tallies are determined based on the requirements of the data owner. Additional management tallies are obtained by dividing the management characteristics in subsets. In one example, two management tallies are determined, a wants and needs management tally and an IT capabilities management tally. Both management tallies are mapped into the information class gradient and a wants and needs management class and an IT capabilities management class is determined.

The normalized business tally is mapped into the information class gradient and the resulting information class is a business information class for the information type (block 520). Additional business tallies are determined based on the requirements of the data owner.

A management weighting factor is determined for the management tally (block 530) and a business weighting factor is determined for the business tally (block 540). The weighting factors allow adjustment of the contribution of the management tally and the business tally to a global tally. The weights are determined based on input by the data owner concerning the relative contribution of each tally to the global tally. In one example, the same weighting factor is applied to each tally.

The management weighting factor is combined with the management tally to yield a weighted management tally (block 550). The business weighting factor is combined with the business tally to yield a weighted business tally (block 560). The weighted tally is the product of the tally and the respective weight for that tally. A global tally is determined by a linear combination of the weighted tallies for the information type (block 570). In one example, the global tally is calculated as follows:

$$G = \sum_{j=1}^{N_j} W_j T_j \text{ such that } \sum_{j=1}^{N_j} W_j = 1$$

Where:
G is the global tally;
$W_j$ is the weighting factor for the $j^{th}$ tally;
$T_j$ is the $j^{th}$ tally; and
$N_j$ is the total number of tallies for the information type.

The global information class for the information type is determined (block 580). The global tally is mapped into the information class gradient and the resulting information class is the global information class for that information type.

An evaluation of the global information class (block 590), allows for an adjustment of the weighting factors. If updated weighting factors are determined after the evaluation (block 592) a new weighted management tally is determined at block 550 and a new weighted business tally is determined at block 560. A new global tally is calculated from an updated weighted management tally and an updated weighted business tally at block 570. The new global tally is mapped into the information class gradient to determine a new global information class at block 580. The evaluation at block 590 continues until the weighting factors remain unchanged.

If the weighting factors remain unchanged, the method terminates (block 595).

Figure 6:
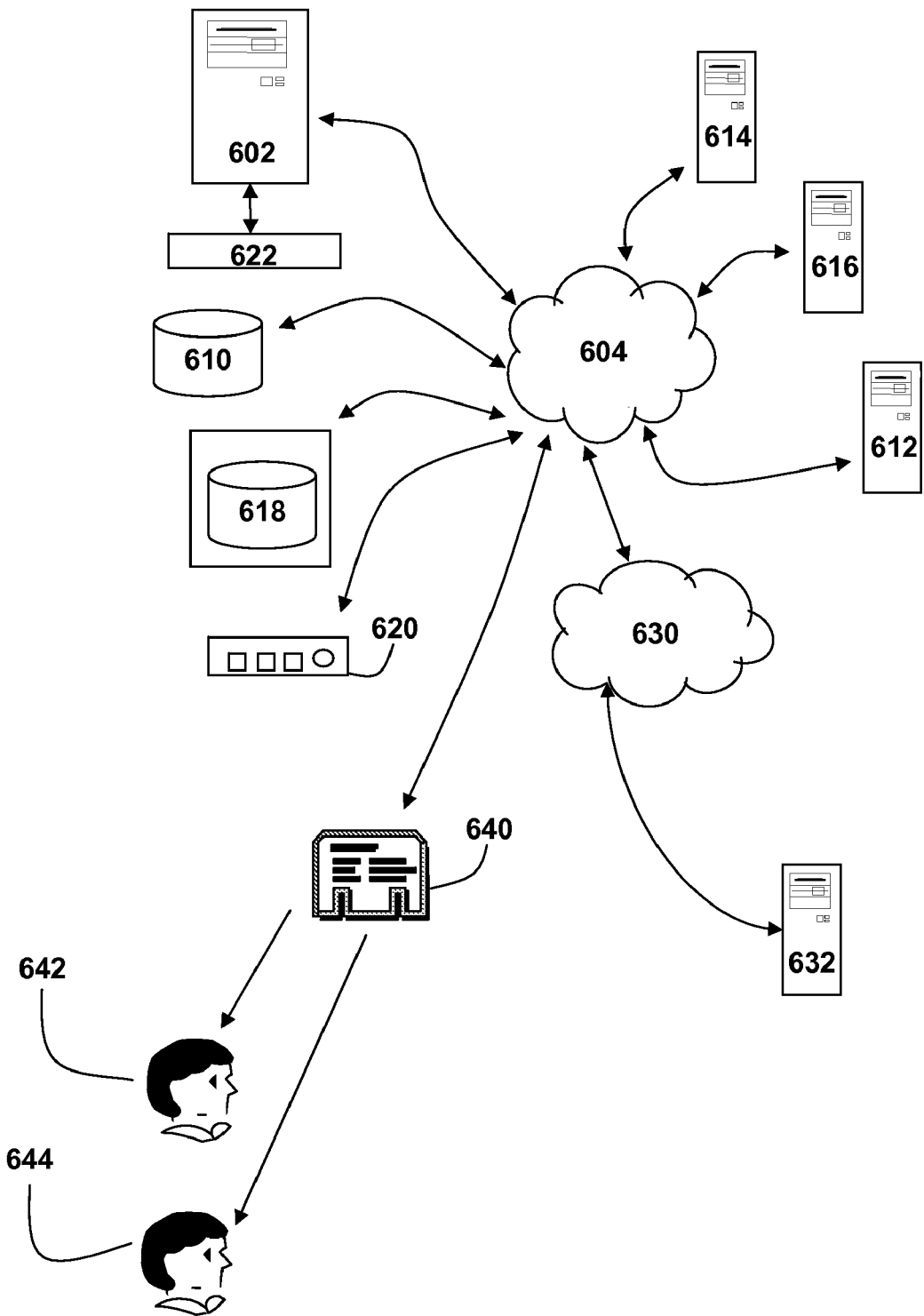
FIG. 6 illustrates a schematic representative of one example of a system for classifying information, in accordance with the invention.

FIG. 6 illustrates a schematic representative of one example of a system for classifying information, in accordance with the invention at 600.

Information classification system may be implemented on a data processing system 602 such as a server system, network computer or personal computer. Data processing system 602 includes a computer usable medium storing computer program code for classifying data.

Data processing system 602 is connected to a variety of network components through network 604. Network components include any number of databases 610, client computers 612, personal computers 614, server systems 616, storage units 618, routers 620, and additional components not shown for managing data on the network 604. Data Processing system 602 includes a computer usable medium including program code for communication with network components. Examples of computer usable media include optical media such as CD-ROM, solid state media such as flash, and magnetic media such as a disk drive. Computer usable media also includes data transport media such as network 604.

Data processing system 602 receives information types and classification instructions through a data input device 622, such as a keyboard or microphone or through network 604. In one example, network 604 is implemented as an Internet protocol (IP) network. In other examples, network 604 is implemented as a wired network, an optical network, a fiber network, other wireless networks, or any combination thereof.

In one example, data processing system 602 includes a computer usable medium to execute Internet browser and Internet-access computer programs for sending and receiving data over network 604 and, optionally, any number of additional wired or wireless communication networks 630. Additional communication networks 630 include external or remote networks and include any number of remote systems 632. Additional communication networks are connected to network 604.

Personal computer 614 or client computer 612 sends classification input such as selected information management characteristics and selected business characteristics through a web-page interface using communication standards such as hypertext transport protocol (HTTP), and transport-control protocol and Internet protocol (TCP/IP). In one example, the data includes directives to process the information types for classification. In operation, a data owner 642 or other authorized party 644 utilizes computer 612 to initiate information classification. In one example classified data is stored in storage unit 618.

A classification report 640 includes selected management characteristics and associated scores, selected business characteristics and associated scores, calculated management tally, calculated business tally, determined management information class, determined business information class, determined global information class, or some combination thereof. In one example, classification report 640 is made available to data owner 642 or other authorized party 644. In another example, inquires for further refinement of the information classification is included with classification report 640. Additional reports are provided as necessary.

While the examples of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A computer-implemented method for classifying information comprising:
   determining a plurality of management characteristics for an information type;
   determining a plurality of business characteristics for the information type;
   determining at least one management tally for the information type based on the management characteristics;
   determining a management characteristic scoring scale;
   assigning a management characteristic score to each management characteristic for the information type;
   calculating a linear combination of the management characteristic scores associated with the information type;
   determining at least one business tally for the information type based on the business characteristics wherein determining the business tally comprises:
   determining a business characteristic scoring scale;
   assigning a business characteristic score to each business characteristic for the information type; and
   calculating a linear combination of the business characteristic scores associated with the information type;
   determining a normalization factor for the business tally;
   determining at least one management weighting factor for each or for all of the management characteristics;
   determining at least one business weighting factor for each or for all of the business characteristics;
   determining an information class gradient based on the management tally and an information class value wherein the information class gradient includes a plurality of information classes having an information class range;
   providing the information class value wherein the information class value represents the number of information classes in the information class gradient;

calculating a maximum possible management tally wherein the maximum possible management tally is a summation of a maximum management characteristic score for each management characteristic;

calculating the information class range as the quotient of the maximum possible management tally and the information class value;

determining at least one management information class based on the management tally and the information class gradient;

determining at least one business information class based on the business tally and the information class gradient;

determining a global information class for the information type based on the management tally and the business tally wherein determining the global information class for the information type comprises:

combining the at least one management weighting factor with the management tally to yield a weighted management tally;

combining the at least one business weighting factor with the business tally to yield a weighted business tally;

calculating a global tally based on the weighted management tally and the weighted business tally;

mapping the global tally into the information class gradient, and continuously updating the global tally based on an evaluation of the global information class;

defining the management characteristics;

defining the business characteristics; and storing the information type based on the information class gradient.

* * * * *